(12) United States Patent
Oyabu et al.

(10) Patent No.: US 8,477,212 B2
(45) Date of Patent: Jul. 2, 2013

(54) CAMERA DEVICE, EXPOSURE CONTROL METHOD, AND PROGRAM

(75) Inventors: Satoru Oyabu, Kanagawa (JP); Yasuji Nakamura, Fukuoka (JP); Satoshi Kawakami, Fukuoka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/321,747

(22) PCT Filed: Mar. 31, 2010

(86) PCT No.: PCT/JP2010/002361
§ 371 (c)(1),
(2), (4) Date: Jan. 20, 2012

(87) PCT Pub. No.: WO2010/137224
PCT Pub. Date: Dec. 2, 2010

(65) Prior Publication Data
US 2012/0120280 A1 May 17, 2012

(30) Foreign Application Priority Data
May 25, 2009 (JP) .................................. 2009-124961

(51) Int. Cl.
*H04N 5/235* (2006.01)

(52) U.S. Cl.
USPC .................. 348/229.1; 348/221.1; 348/222.1; 348/362

(58) Field of Classification Search
USPC .................... 348/207.99, 221.1, 222.1, 224.1, 348/229.1, 230.1, 362–368
See application file for complete search history.

(56) References Cited

U.S. PATENT DOCUMENTS 6,141,047 A * 10/2000 Kawai et al. .................. 348/254
6,587,149 B1 7/2003 Yoneyama et al.
7,586,523 B2 * 9/2009 Egawa et al. .............. 348/229.1
(Continued)

FOREIGN PATENT DOCUMENTS

EP 0910209 4/1999
EP 1117252 7/2001
(Continued)

OTHER PUBLICATIONS

International Preliminary Report on Patentability for PCT/JP2010/002361, dated Dec. 22, 2011 (translation of Form PCT/ISA/237).
(Continued)

*Primary Examiner* — Sinh Tran
*Assistant Examiner* — Selam Gebriel
(74) *Attorney, Agent, or Firm* — Greenblum & Bernstein, P.L.C.

(57) ABSTRACT

A camera device is provided with an imager that outputs a long exposure signal and a short exposure signal within one field period; a knee processor that compresses a long exposure signal having the luminance level of a knee point or higher at a compression rate (i.e., decreases an inclination of an incident light amount-luminance level line, representing a variation in a luminance level with an amount of incident light); and a knee controller that adjusts the knee point and the compression rate according to a luminance level of a synthesized signal obtained by synthesizing the long exposure signal and the short exposure signal. In this knee control, the knee point decreases with an increase in the luminance level of the synthesized signal, and the inclination is adjusted to approach an original inclination thereof.

5 Claims, 6 Drawing Sheets

U.S. PATENT DOCUMENTS

| | | | |
|---|---|---|---|
| 7,760,243 B2 * | 7/2010 | Moriyama et al. | 348/222.1 |
| 8,144,214 B2 * | 3/2012 | Yamashita et al. | 348/229.1 |
| 8,390,690 B2 * | 3/2013 | Lim | 348/216.1 |
| 2001/0001245 A1 * | 5/2001 | Kamishima et al. | 348/229 |
| 2001/0008419 A1 * | 7/2001 | Sano et al. | 348/222 |
| 2001/0040628 A1 * | 11/2001 | Akahori et al. | 348/229 |
| 2003/0001962 A1 | 1/2003 | Sakurai | |
| 2006/0012507 A1 | 1/2006 | Nitta et al. | |
| 2006/0033823 A1 * | 2/2006 | Okamura | 348/254 |
| 2007/0097240 A1 * | 5/2007 | Egawa et al. | 348/308 |
| 2007/0296849 A1 | 12/2007 | Sano et al. | |
| 2008/0007629 A1 * | 1/2008 | Moriyama et al. | 348/222.1 |
| 2009/0153699 A1 * | 6/2009 | Satoh et al. | 348/229.1 |

FOREIGN PATENT DOCUMENTS

| | | |
|---|---|---|
| JP | 03-238429 | 10/1991 |
| JP | 05-103256 | 4/1993 |
| JP | 2000-78437 | 3/2000 |
| JP | 2001-197362 | 7/2001 |

OTHER PUBLICATIONS

U.S. Appl. No. 13/321,991 to Yuichiro Mori et al., filed Nov. 22, 2011.

Search report from E.P.O., mail date is Feb. 28, 2012.

* cited by examiner (a)

(b)

(a)

(b)

(a)

PRIOR ART

(b)

PRIOR ART

CAMERA DEVICE, EXPOSURE CONTROL METHOD, AND PROGRAM

TECHNICAL FIELD

The present invention relates to a camera device including a function to expand a dynamic range by using a long exposure signal and a short exposure signal.

BACKGROUND ART

Conventionally, various backlight correction techniques have been used in camera devices. As one of the backlight correction techniques, there is known, for example, a method for expanding a dynamic range by using an image pickup element in which a long exposure signal (video signal having a long exposure time) and a short exposure signal (video signal having a short exposure time) are output within one field period (see, for example, Patent Literature 1). In general, in a conventional method, knee processing for compressing a signal at the luminance level of a knee point (predetermined luminance level) or higher is performed in order to widen a dynamic range. After the knee-processed long exposure signal and short exposure signal are synthesized, a tone correction is made to the synthesized signal to output a final video signal. Note that the synthesis of the long exposure signal and the short exposure signal is performed so that the long exposure signal is used for luminance levels lower than the predetermined luminance level (synthesis point), and the short exposure signal is used for the luminance level of the synthesis point or higher.

In commonly-used knee processing, a knee point is a fixed value. In that case, there has been the problem that it is difficult to smoothly synthesize the long exposure signal and the short exposure signal, thus causing a sense of gradation to deteriorate. Hence, there has been conventionally proposed a technique to perform control, so as to lower the knee point of a long exposure signal and raise the gain of a short exposure signal, only when a subject (extremely bright subject) for which a dynamic range needs to be expanded is photographed.

FIG. 6 is an explanatory drawing of knee point control in conventional knee processing. As illustrated in FIG. 6(a), knee processing for compressing signals at the luminance level of a knee point or higher is performed on a long exposure signal when a bright subject is photographed. On the other hand, as illustrated in FIG. 6(b), a knee point adjustment is made so as to lower the knee point when a brighter subject is photographed. Consequently, it is possible to obtain an image improved to some degree in the sense of gradation.

However, simply lowering the knee point of a long exposure signal as in the conventional method is not sufficient in terms of improvement in the sense of gradation. That is, since an inclination at the synthesis point of the long exposure signal and the short exposure signal (inclination of an incident light amount-luminance level line representing a variation of the luminance level with the incident light amount) differs, an image taken results in a weakly-contrasted image. In addition, in the conventional method, the long exposure signal and the short exposure signal differ in inclination at such a comparatively high-brightness part (bright part within an image) as the synthesis point of the long exposure signal and the short exposure signal. This gives the impression that gradational variation is not smooth (even in the case of such a degree of shift in gradational variation as not to be concerned about in dark parts within a screen).

CITATION LIST

Patent Literature

Patent Literature 1: Japanese Patent Laid-Open No. 2001-197362

SUMMARY OF INVENTION

Technical Problem

The present invention has been accomplished under the above-described circumstances. Accordingly, an object of the present invention is to provide a camera device capable of expanding a dynamic range by using a long exposure signal and a short exposure signal, and obtaining an image sharply contrasted in bright parts within a screen.

Solution to Problem

One aspect of the present invention is a camera device, and this camera device comprises: an imaging unit for outputting a long exposure signal which is a video signal having a long exposure time and a short exposure signal which is a video signal having a short exposure time within one field period; a knee processing unit for compressing, at a predetermined compression rate, the long exposure signal having a luminance level equal to or higher than a knee point which is a reference luminance level at which knee processing is performed, to decrease the inclination of an incident light amount-luminance level line representing the variation of a luminance level with the amount of incident light input to the imaging unit; and a knee control unit for adjusting the knee point and the compression rate according to the luminance level of a synthesized signal obtained by synthesizing the long exposure signal and the short exposure signal, so as to make the knee point lower with an increase in the luminance level and revert the inclination to the original state thereof.

Another aspect of the present invention is an exposure control method, and this exposure control method is used in a camera device comprising an imaging unit for outputting a long exposure signal which is a video signal having a long exposure time and a short exposure signal which is a video signal having a short exposure time within one field period, the method including: compressing, at a predetermined compression rate, the long exposure signal having a luminance level equal to or higher than a knee point which is a reference luminance level at which knee processing is performed, to decrease the inclination of an incident light amount-luminance level line representing the variation of a luminance level with the amount of incident light input to the imaging unit; and adjusting the knee point and the compression rate according to the luminance level of a synthesized signal obtained by synthesizing the long exposure signal and the short exposure signal, so as to make the knee point lower with an increase in the luminance level and revert the inclination to the original state thereof.

Yet another aspect of the present invention is a program, and this program is used for the exposure control of a camera device comprising an imaging unit for outputting a long exposure signal which is a video signal having a long exposure time and a short exposure signal which is a video signal having a short exposure time within one field period; the program causing a computer to perform the processes of:

compressing, at a predetermined compression rate, the long exposure signal having a luminance level equal to or higher than a knee point which is a reference luminance level at which knee processing is performed, to decrease the inclination of an incident light amount-luminance level line representing the variation of a luminance level with the amount of incident light input to the imaging unit; and adjusting the knee point and the compression rate according to the luminance level of a synthesized signal obtained by synthesizing the long exposure signal and the short exposure signal, so as to make the knee point lower with an increase in the luminance level and revert the inclination to the original state thereof.

As will be described hereinafter, the present invention includes other aspects. Accordingly, this disclosure of the present invention is intended to provide some aspects of the present invention, and is not intended to restrict the scope of the invention described and claimed herein.

DESCRIPTION OF EMBODIMENTS

Figure 1:
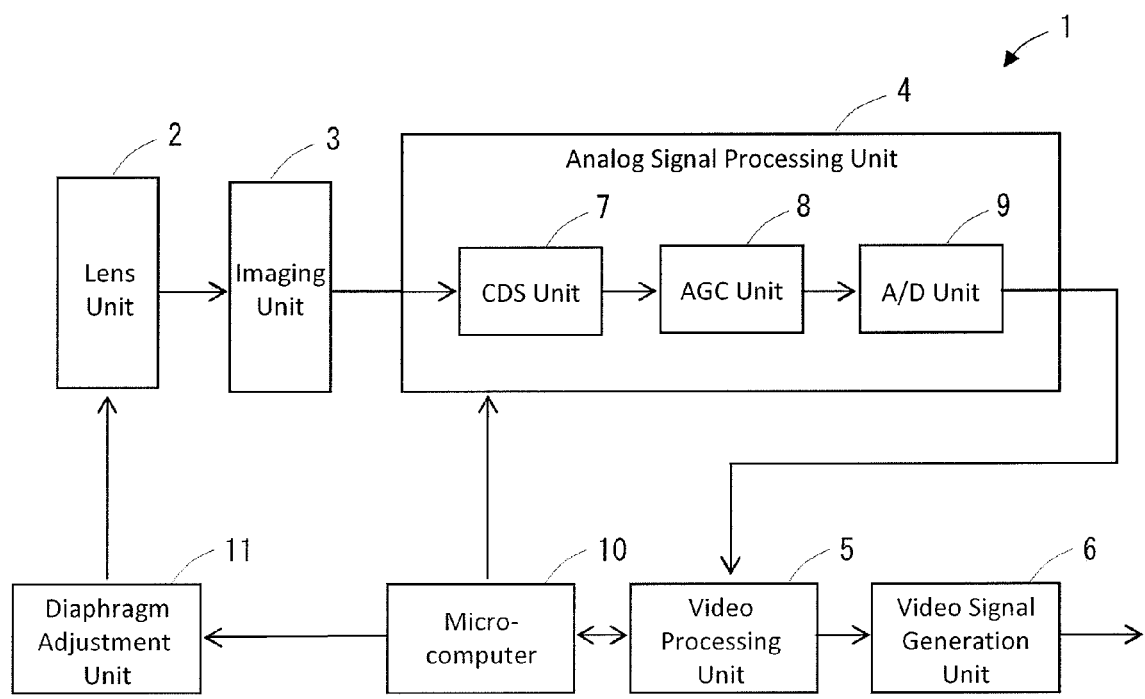
FIG. 1 is a block diagram illustrating an overall configuration of a camera device in an embodiment of the present invention.

Hereinafter, the present invention will be described in detail. It should be noted, however, that the detailed description given hereinafter and the accompanying drawings do not restrict the invention.

A camera device of the present invention has a configuration comprising: an imaging unit for outputting a long exposure signal which is a video signal having a long exposure time and a short exposure signal which is a video signal having a short exposure time within one field period; a knee processing unit for compressing, at a predetermined compression rate, the long exposure signal having a luminance level equal to or higher than a knee point which is a reference luminance level at which knee processing is performed, to decrease the inclination of an incident light amount-luminance level line representing the variation of a luminance level with the amount of incident light input to the imaging unit; and a knee control unit for adjusting the knee point and the compression rate according to the luminance level of a synthesized signal obtained by synthesizing the long exposure signal and the short exposure signal, so as to make the knee point lower with an increase in the luminance level and revert the inclination to the original state thereof.

According to this configuration, it is possible to obtain an image having an expanded dynamic range when a bright subject is photographed (in a case, for example, where the luminance level of a bright part within a screen is extremely high or the area of the bright part is large) by synthesizing a long exposure signal and a short exposure signal. In addition, in this case, knee control to adjust a knee point and a compression rate according to the luminance level of the synthesized signal of the long exposure signal and the short exposure signal is performed in knee processing with respect to the long exposure signal (specifically, the knee point and the compression rate are adjusted, so as to make the knee point lower with an increase in the luminance level and revert the inclination to the original state thereof). Consequently, the inclinations of the incident light amount-luminance level lines of the long exposure signal and the short exposure signal approximate to each other in the vicinity of a synthesis point of the long exposure signal and the short exposure signal. Accordingly, it is possible to obtain an image sharply contrasted (an image smooth in gradational variation, i.e., a linearly-gradated image) in bright parts within a screen (near the synthesis point).

In addition, the camera device of the present invention may have a configuration comprising: a low-luminance area detection unit for detecting a low-luminance area at a predetermined threshold luminance level or lower in an image obtained by synthesizing the long exposure signal and the short exposure signal; and a gain control unit for raising the gain of the long exposure signal in the low-luminance area.

According to this configuration, gain control to raise the gain of long exposure signals in the low-luminance area is performed when a dark part (low-luminance area) is detected within a screen. If knee control to adjust the knee point and the compression rate is performed on long exposure signals, an image of the low-luminance area (dark part within a screen) may become somewhat distorted. By performing gain control to raise the gain of long exposure signals in the low-luminance area as described above, it is possible to obtain an image in which even the dark part within a screen is clearly visible. Accordingly, visibility with respect to dark parts required particularly of a monitoring camera and the like is improved.

The camera device of the present invention may have a configuration comprising: a dynamic area detection unit for detecting a dynamic area including a moving subject in an image obtained by synthesizing the long exposure signal and the short exposure signal; and a second gain control unit for raising the gain of the long exposure signal in the dynamic area.

According to this configuration, gain control to raise the gain of long exposure signals in the dynamic area is performed when a moving subject is detected within a screen. Consequently, it is possible to obtain an image in which the moving subject within a screen is clearly visible. Accordingly, visibility with respect to moving subjects required particularly of a monitoring camera and the like is improved.

An exposure control method of the present invention used in a camera device comprising an imaging unit for outputting a long exposure signal which is a video signal having a long exposure time and a short exposure signal which is a video signal having a short exposure time within one field period, includes: compressing, at a predetermined compression rate, the long exposure signal having a luminance level equal to or higher than a knee point which is a reference luminance level at which knee processing is performed, to decrease the inclination of an incident light amount-luminance level line representing the variation of a luminance level with the amount of incident light input to the imaging unit; and adjusting the knee point and the compression rate according to the luminance level of a synthesized signal obtained by synthesizing the long exposure signal and the short exposure signal, so as to make the knee point lower with an increase in the luminance level and revert the inclination to the original state thereof.

Also according to this method, it is possible to obtain an image having an expanded dynamic range when a bright subject is photographed (in a case, for example, where the luminance level of a bright part within a screen is extremely high or the area of the bright part is large) by synthesizing a long exposure signal and a short exposure signal, as described above. In addition, knee control to adjust the knee point and the compression rate according to the luminance level of the synthesized signal of the long exposure signal and the short exposure signal is performed in knee processing with respect to long exposure signals (specifically, the knee point and the compression rate are adjusted, so as to make the knee point lower with an increase in the luminance level and revert the inclination to the original state thereof). Consequently, the inclinations of incident light amount-luminance level lines of long exposure signals and short exposure signals approximate to each other in the vicinity of a synthesis point of the long exposure signal and the short exposure signal. Accordingly, it is possible to obtain an image sharply contrasted (an image smooth in gradational variation, i.e., a linearly-gradated image) in bright parts within a screen (near the synthesis point).

A program of the present invention used for the exposure control of a camera device comprising an imaging unit for outputting a long exposure signal which is a video signal having a long exposure time and a short exposure signal which is a video signal having a short exposure time within one field period, causes a computer to perform the processes of: compressing, at a predetermined compression rate, the long exposure signal having a luminance level equal to or higher than a knee point which is a reference luminance level at which knee processing is performed, to decrease the inclination of an incident light amount-luminance level line representing the variation of a luminance level with the amount of incident light input to the imaging unit; and adjusting the knee point and the compression rate according to the luminance level of a synthesized signal obtained by synthesizing the long exposure signal and the short exposure signal, so as to make the knee point lower with an increase in the luminance level and revert the inclination to the original state thereof.

Also according to this program, it is possible to obtain an image having an expanded dynamic range when a bright subject is photographed (in a case, for example, where the luminance level of a bright part within a screen is extremely high or the area of the bright part is large) by synthesizing the long exposure signal and the short exposure signal, as described above. In addition, knee control to adjust the knee point and the compression rate according to the luminance level of the synthesized signal of the long exposure signal and the short exposure signal is performed in knee processing with respect to long exposure signals (specifically, the knee point and the compression rate are adjusted, so as to make the knee point lower with an increase in the luminance level and revert the inclination to the original state thereof). Consequently, the inclinations of the incident light amount-luminance level lines of the long exposure signal and the short exposure signal approximate to each other in the vicinity of a synthesis point of the long exposure signal and the short exposure signal. Accordingly, it is possible to obtain an image sharply contrasted (an image smooth in gradational variation, i.e., a linearly-gradated image) in bright parts within a screen (near the synthesis point).

The present invention makes it possible to obtain an image sharply contrasted in bright parts within a screen by adjusting the knee point and the compression rate, so as to make the knee point lower with an increase in the luminance level and revert the inclination of an incident light amount-luminance level line to the original state thereof.

Hereinafter, a camera device according to an embodiment of the present invention will be described using drawings. In the present embodiment, a camera device used in a monitoring camera or the like will be cited by way of example. This camera device includes an exposure control function. This function is realized by a program stored in a memory or the like of the camera device.

A configuration of the camera device according to an embodiment of the present invention will be described with reference to drawings. FIG. 1 is a block diagram illustrating an overall configuration of the camera device of the present embodiment. As illustrated in FIG. 1, a camera device 1 comprises a lens unit 2 including an optical lens and an aperture diaphragm, and an imaging unit 3 including an image pickup element, such as a CCD. The image pickup element of this imaging unit 3 has a double-speed driving function to output a long exposure signal (video signal having a long exposure time) and a short exposure signal (video signal having a short exposure time) within one field period.

In addition, the camera device 1 comprises: an analog signal processing unit 4 for performing predetermined pre-processing on a long exposure signal and a short exposure signal output from the imaging unit 3; a video processing unit 5 for performing predetermined video processing on a long exposure signal and a short exposure signal output from the analog signal processing unit 4; and a video signal generation unit 6 for synthesizing a long exposure signal and a short exposure signal output from the video processing unit 5 to output a final video signal. Note that processing to make a tone correction to a synthesized signal of the long exposure signal and the short exposure signal is performed at this video signal generation unit 6.

The analog signal processing unit 4 comprises: a CDS unit 7 for performing correlated double sampling processing (CDS processing) on a long exposure signal and a short exposure signal output from the imaging unit 3; an AGC unit 8 for performing automatic gain control (AGC) on the CDS-processed long exposure signal and short exposure signal; and an A/D unit 9 for performing analog/digital conversion processing (A/D conversion processing) on the automatic gain-controlled long exposure signal and short exposure signal. This camera device 1 includes a microcomputer 10 for controlling the operation of respective units, and the operation of the analog signal processing unit 4 and the video processing unit 5 is controlled by the microcomputer 10.

This camera device 1 further comprises an aperture diaphragm adjustment unit 11 for adjusting the aperture diaphragm of the lens unit 2. This aperture diaphragm adjustment unit 11 is controlled by the microcomputer 10, so as to adjust the amount of aperture according to the luminance level of a synthesized signal of a long exposure signal and a short exposure signal. Accordingly, at the time of normal photography (when any bright subjects are not photographed), it is possible to obtain an image having appropriate brightness (luminance level) by adjusting the amount of aperture by using the aperture diaphragm adjustment unit 11.

Figure 2:
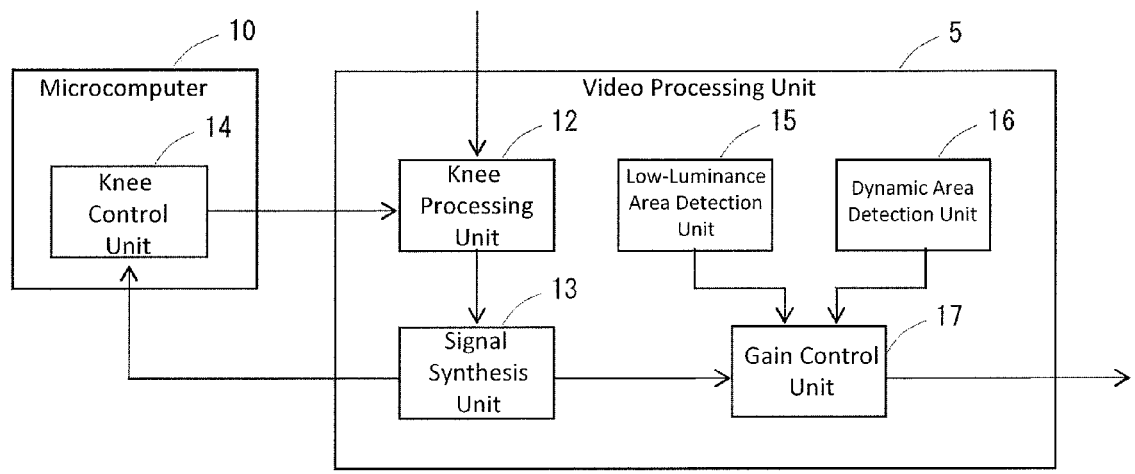
FIG. 2 is a functional block diagram of a video processing unit and a microcomputer of a camera device.

Next, the functions of the video processing unit 5 will be described with reference to FIG. 2. The video processing unit 5 comprises, for example, a DSP and has various functions related to the exposure control of the present invention. FIG. 2 is a functional block diagram of the video processing unit 5 and the microcomputer 10. As illustrated in FIG. 2, the video processing unit 5 comprises a knee processing unit 12 for performing knee processing on a long exposure signal; and a signal synthesis unit 13 for synthesizing the knee-processed long exposure signal and short exposure signal.

In the knee processing unit 12, knee processing is performed in which a long exposure signal having a luminance level equal to or higher than a knee point (a reference luminance level at which knee processing is performed) is compressed at a predetermined compression rate, to decrease the inclination of an incident light amount-luminance level line (a line representing the variation of a luminance level with the amount of incident light input to the imaging unit 3). The knee point and the compression rate used in knee processing are adjusted by the knee control unit 14 of the microcomputer 10. Specifically, knee control is performed so as to make the knee point lower with an increase in the luminance level of a synthesized signal of the long exposure signal and the short exposure signal synthesized by the signal synthesis unit 13 and revert (increase) the inclination of an incident light amount-luminance level line to the original state thereof. Note that details on this knee control (adjustment of the knee point and the compression rate) will be described later using drawings.

The video processing unit 5 also comprises: a low-luminance area detection unit 15 having a function to detect a low-luminance area (low-luminance area at a predetermined threshold luminance level or lower) if a dark dart is contained within a screen; and a dynamic area detection unit 16 having a function to detect a moving part (dynamic area) if the dynamic area is contained within a screen. The video processing unit 5 further comprises a gain control unit 17 for raising the gain of long exposure signals in these low-luminance and dynamic areas. Note that details on this gain control will be described later using drawings.

The operation of the camera device 1 configured as described above will be described with reference to drawings. Here, the operation will be described with a focus on the characteristic behaviors (exposure control using a long exposure signal and a short exposure signal) of the present invention.

Note that it is possible to obtain an image having appropriate brightness (luminance level) at the time of normal photography (when any bright subjects are not photographed) by adjusting the amount of aperture by using the aperture diaphragm adjustment unit 11, though this will not be explained here. In addition, if somewhat bright parts (parts too bright to be coped with by aperture diaphragm adjustment alone) are contained within a screen, knee processing is performed on the bright parts by the knee processing unit 12 to expand a dynamic range, though exposure control of the present invention by using a long exposure signal and a short exposure signal is not performed. That is, exposure control using the long exposure signal and the short exposure signal to be described hereinafter is performed when any extremely bright parts (parts too bright to be coped with by knee processing alone) are contained within a screen.

Figure 3:
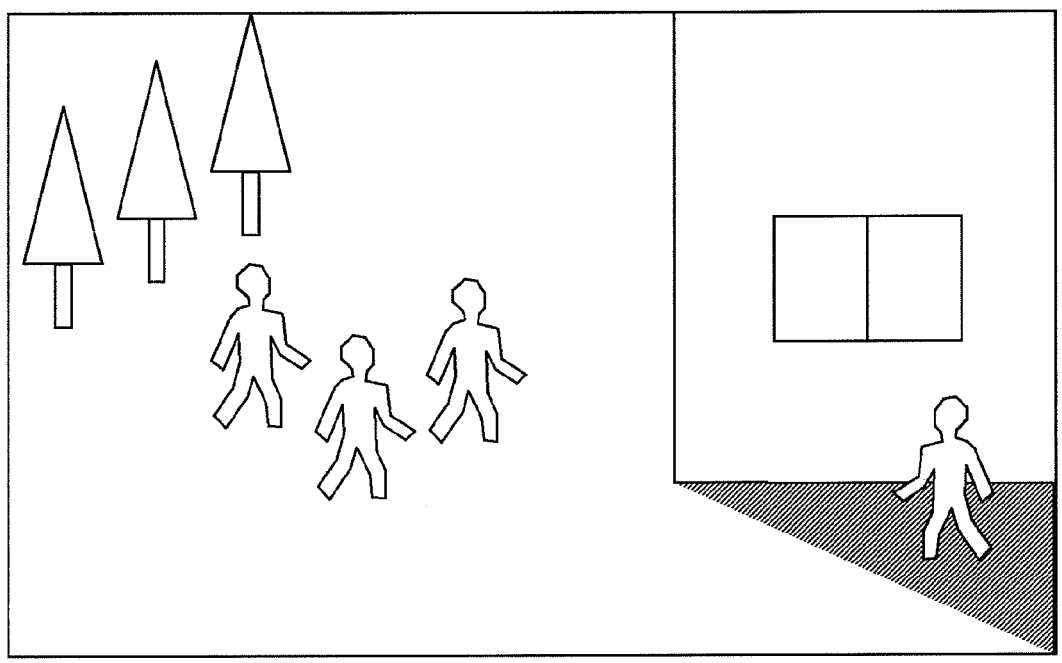
FIG. 3 is a drawing illustrating one example of an image (monitoring image) taken with a camera device.

FIG. 3 is a drawing illustrating one example of an image (monitoring image) taken by the camera device 1. In the example of FIG. 3, the image contains a sunny part (bright part) on the left side of a screen. Accordingly, in this case, exposure control using a long exposure signal and a short exposure signal is performed. Specifically, the adjustment of a knee point and a compression rate is made according to the luminance level of a synthesized signal of the long exposure signal and the short exposure signal, and knee processing is performed on the long exposure signal.

Figure 4:
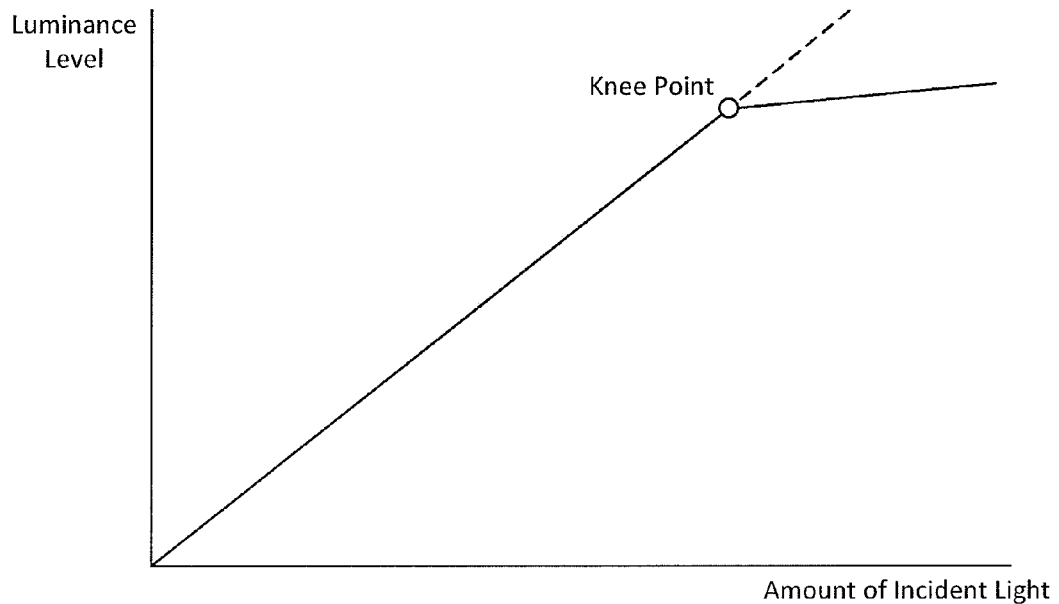
FIG. 4(*a*) is an explanatory drawing of a knee point, whereas FIG. 4(*b*) is an explanatory drawing of knee control (adjustment of a knee point and a compression rate) in the present invention.
Figure 4:
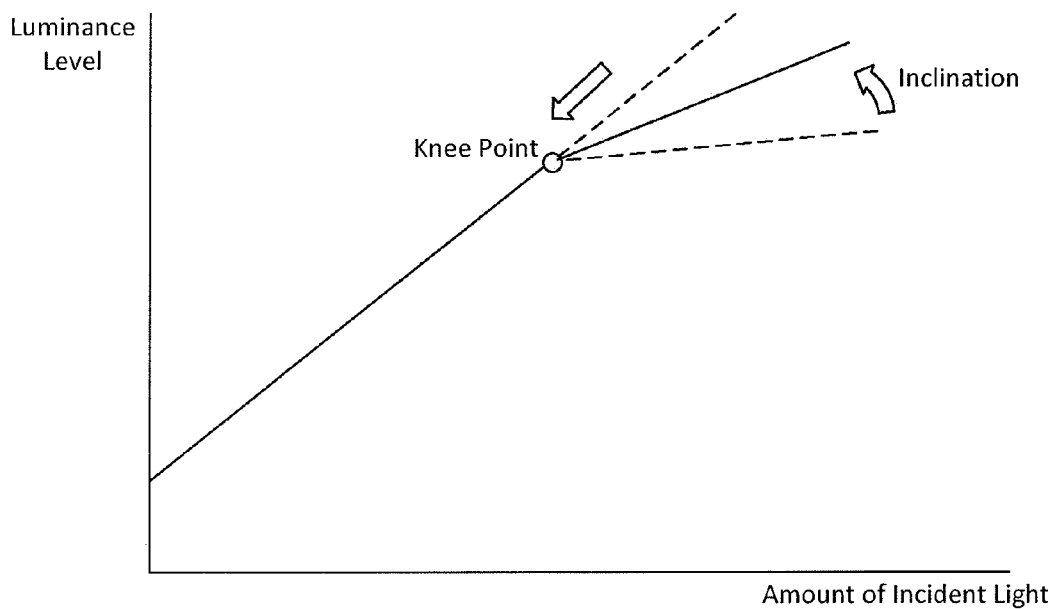

FIG. 4 is an explanatory drawing of knee control (adjustment of a knee point and a compression rate). As illustrated in FIG. 4(a), knee processing for compressing signals at the luminance level of a knee point or higher is performed on a long exposure signal when a bright subject is photographed. In this case, as illustrated in FIG. 4(b), knee control is performed so as to make the knee point lower with an increase in the luminance level of a synthesized signal of a long exposure signal and a short exposure signal and revert (increase) the inclination of an incident light amount-luminance level line to the original state thereof.

In addition, in the example of FIG. 3, the image contains a shady part (shown by shading in the figure) in the lower-right corner of a screen. Accordingly, the low-luminance area detection unit 15 detects this shady part as a low-luminance area, and the gain control unit 17 performs gain control for raising the gain of long exposure signals in the shade part. Yet additionally, in the example of FIG. 3, four pedestrians are included in the screen. Accordingly, the dynamic area detection unit 16 detects these pedestrians' parts as dynamic areas, and the gain control unit 17 performs gain control for raising the gain of long exposure signals in these pedestrians' parts.

Figure 5:
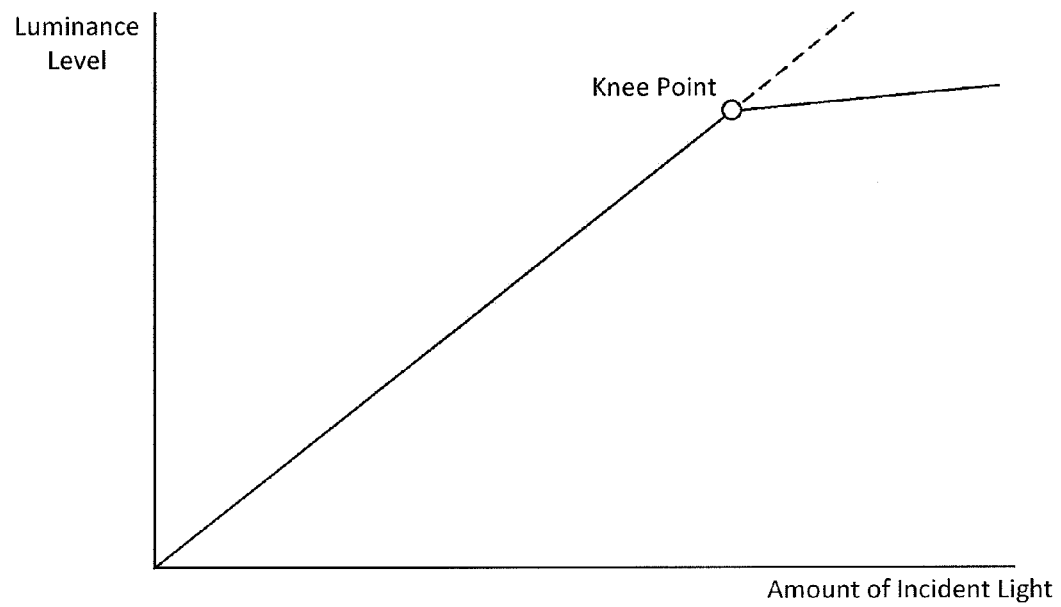
FIG. 5(*a*) is an explanatory drawing of a knee point, whereas FIG. 5(*b*) is an explanatory drawing of knee control (adjustment of a knee point and a compression rate) and gain control in the present invention.
Figure 5:
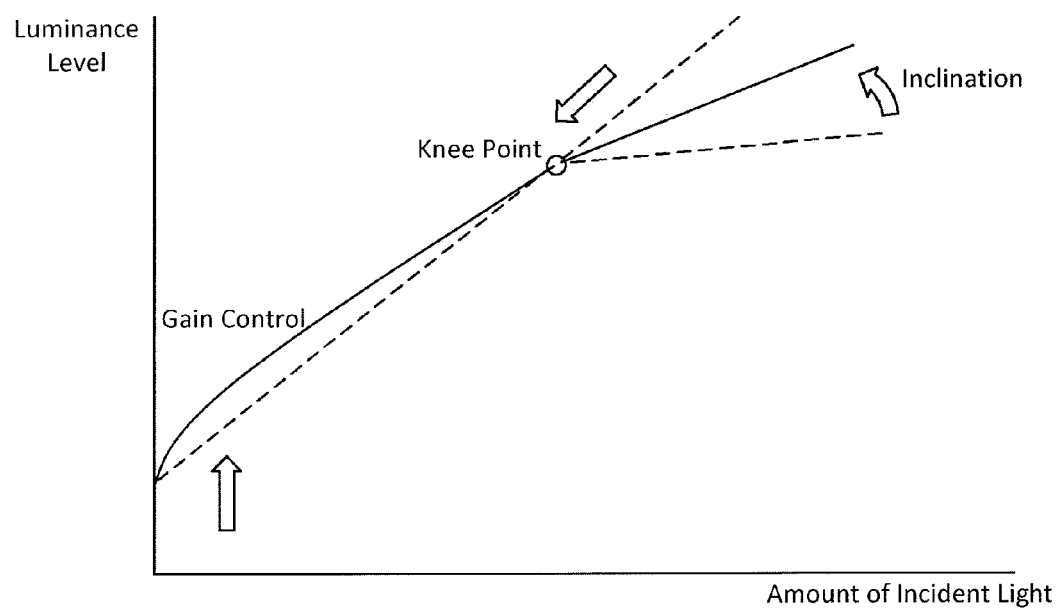
Figure 6:
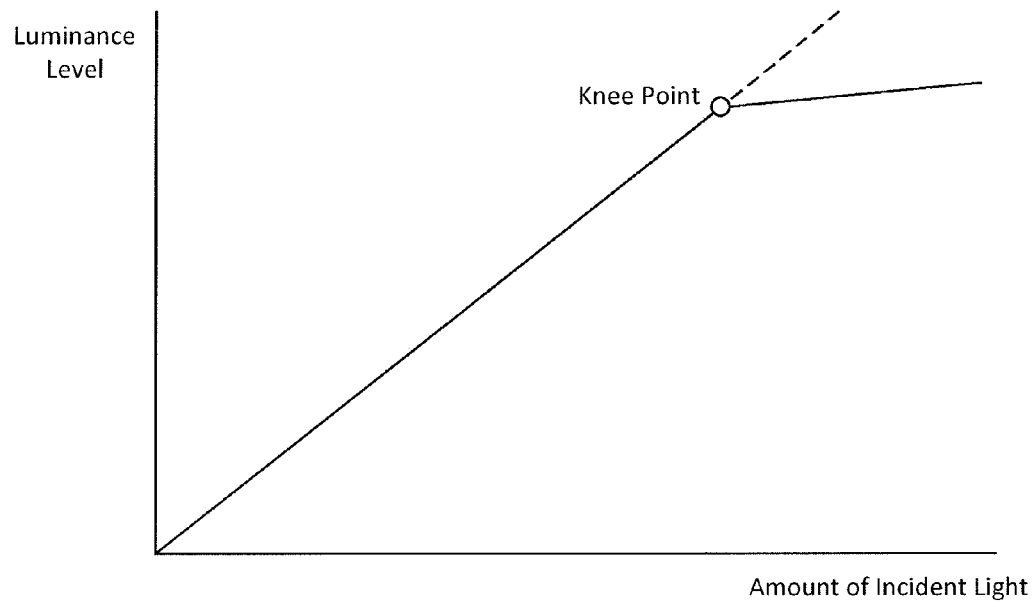
FIG. 6(*a*) is an explanatory drawing of a knee point, whereas FIG. 6(*b*) is an explanatory drawing of conventional knee control (adjustment of a knee point).
Figure 6:
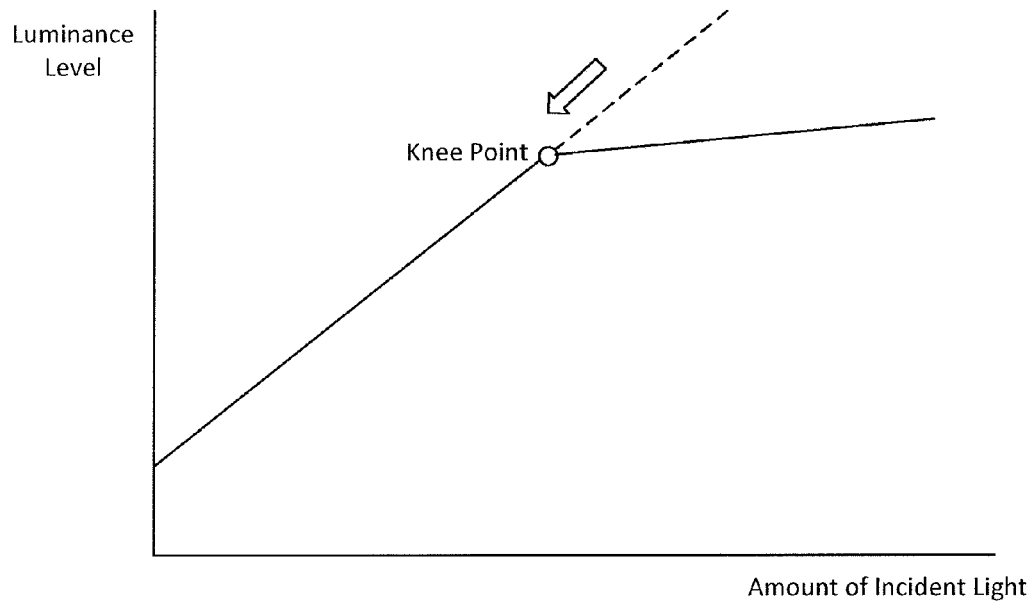

FIG. 5 is an explanatory drawing of knee control (adjustment of a knee point and a compression rate) and gain control (gain control of, for example, low-luminance areas). As illustrated in FIG. 5(a), knee processing for compressing signals at the luminance level of a knee point or higher is performed on a long exposure signal when a bright subject is photographed. In this case, as illustrated in FIG. 5(b), knee control is performed so as to make the knee point lower with an increase in the luminance level of a synthesized signal of a long exposure signal and a short exposure signal and revert (increase) the inclination of an incident light amount-luminance level line to the original state thereof. In addition, gain control for raising the gain of long exposure signals in a low-luminance area is also performed.

According to such a camera device 1 of an embodiment of the present invention as described above, it is possible to obtain a sharply-contrasted image in a bright part within a screen by providing the knee control unit 14 for adjusting the knee point and the compression rate, so as to make the knee point lower with an increase in the luminance level of a synthesized signal of long exposure signals and short exposure signals and revert the inclination of an incident light amount-luminance level line to the original state thereof.

That is, in the present embodiment, it is possible to obtain an image having an expanded dynamic range when a bright subject is photographed (in a case, for example, where the luminance level of a bright part within a screen is extremely high or the area of the bright part is large) by synthesizing a long exposure signal and a short exposure signal. In addition, in this case, knee control to adjust a knee point and a compression rate according to the luminance level of a synthesized signal of the long exposure signal and the short exposure signal is performed in knee processing with respect to long exposure signals (specifically, the knee point and the compression rate are adjusted, so as to make the knee point lower with an increase in the luminance level of the synthesized signal and revert the inclination to the original state thereof). Consequently, the inclinations of incident light amount-luminance level lines of the long exposure signal and the short exposure signal approximate to each other in the vicinity of a synthesis point of the long exposure signal and the short exposure signal. Accordingly, it is possible to obtain an image sharply contrasted (an image smooth in gradational variation, i.e., a linearly-gradated image) in bright parts within a screen (near the synthesis point).

In addition, in the present embodiment, gain control to raise the gain of long exposure signals in the low-luminance area is performed when a dark part (low-luminance area) is detected within the screen. If knee control to adjust the knee point and the compression rate is performed on long exposure signals, an image of the low-luminance area (dark part within a screen) may become somewhat distorted. By performing gain control to raise the gain of long exposure signals in the low-luminance area as described above, it is possible to obtain an image in which even the dark part within a screen is clearly visible. Accordingly, visibility with respect to dark parts required particularly of a monitoring camera and the like is improved.

Yet additionally, gain control to raise the gain of long exposure signals in the dynamic area is performed when a moving subject is detected within the screen. Consequently, it is possible to obtain an image in which the moving subject within a screen is clearly visible. Accordingly, visibility with respect to moving subjects required particularly of a monitoring camera and the like is improved.

While embodiments of the present invention have been described heretofore by way of example, the scope of the present invention is not limited to those embodiments. The invention may be altered or modified according to the purpose thereof within the scope of the appended claims.

While there has been described what are considered at present preferred embodiments of the present invention, it is to be understood that various modifications may be made thereto, and it is intended that the appended claims cover all such modifications that fall within the true spirit and scope of the invention.

INDUSTRIAL APPLICABILITY

As has been described heretofore, a camera device according to the present invention has the advantage of being able to obtain an image sharply contrasted in bright parts within a screen. Accordingly, the camera device is used as a monitoring camera or the like and is, therefore, useful.

REFERENCE SIGNS LIST

1 Camera device
3 Imaging unit
4 Analog signal processing unit
5 Video processing unit
6 Video signal generation unit
10 Microcomputer
12 Knee processing unit
13 Signal synthesis unit
14 Knee control unit
15 Low-luminance area detection unit
16 Dynamic area detection unit
17 Gain control unit

The invention claimed is:

1. A camera device comprising:
an imager which outputs a long exposure signal and a short exposure signal, the long exposure signal being a video signal which has a long exposure time and the short exposure signal being a video signal which has a short exposure time within one field period;
a knee processor which compresses, at a compression rate, the long exposure signal having a luminance level equal to or higher than a knee point, which is a reference luminance level of the long exposure signal at which knee processing is performed, to decrease an inclination of an incident light amount-luminance level line, which represents a variation in the luminance level of the long exposure signal with an amount of incident light input to the imager; and
a knee controller which adjusts the knee point and the compression rate according to a luminance level of a synthesized signal obtained by synthesizing the long exposure signal and the short exposure signal, to make the knee point lower with an increase in the luminance level of the synthesized signal and to adjust the inclination to approach an original inclination before the knee processor compresses the long exposure signal.

2. The camera device according to claim 1, further comprising:
a low-luminance area detector which detects a low-luminance area at a predetermined threshold luminance level or lower in an image obtained by synthesizing the long exposure signal and the short exposure signal; and
a gain controller which raises a gain of the long exposure signal in the low-luminance area.

3. The camera device according to claim 1, further comprising:
a dynamic area detector which detects a dynamic area which includes a moving subject in an image obtained by synthesizing the long exposure signal and the short exposure signal; and
a gain controller which raises a gain of the long exposure signal in the dynamic area.

4. An exposure control method used in a camera device, including an imager which outputs a long exposure signal and a short exposure signal, the long exposure signal being a video signal which has a long exposure time and a short exposure signal being a video signal which has a short exposure time within one field period, the method including:
compressing, at a compression rate, the long exposure signal having a luminance level equal to or higher than a knee point, which is a reference luminance level of the long exposure signal at which knee processing is performed, to decrease an inclination of an incident light amount-luminance level line, which represents a variation in the luminance level of the long exposure signal with an amount of incident light input to the imager; and
adjusting the knee point and the compression rate according to a luminance level of a synthesized signal obtained by synthesizing the long exposure signal and the short exposure signal, to make the knee point lower with an increase in the luminance level of the synthesized signal and to adjust the inclination to approach an original inclination before the knee processor compresses the long exposure signal.

5. A non-transitory computer readable medium that stores a program used for exposure control of a camera device including an imager which outputs a long exposure signal and a short exposure signal, the long exposure signal being a video signal which has a long exposure time and a short exposure signal being a video signal which has a short exposure time within one field period; the program causing a computer to perform:
compressing, at a compression rate, the long exposure signal having a luminance level equal to or higher than a knee point which is a reference luminance level of the long exposure signal at which knee processing is performed, to decrease an inclination of an incident light amount-luminance level line, which represents a variation in the luminance level of the long exposure signal with an amount of incident light input to the imager; and
adjusting the knee point and the compression rate according to a luminance level of a synthesized signal obtained by synthesizing the long exposure signal and the short exposure signal, to make the knee point lower with an increase in the luminance level of the synthesized signal and to adjust the inclination to approach an original inclination before the knee processor compresses the long exposure signal.

* * * * *